(12) United States Patent
Kim

(10) Patent No.: US 12,466,477 B2
(45) Date of Patent: Nov. 11, 2025

(54) ELECTRONIC STEERING APPARATUS FOR VEHICLE AND METHOD OF CONTROLLING THE SAME

(71) Applicant: HYUNDAI MOBIS CO., LTD., Seoul (KR)

(72) Inventor: Dong Hee Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 140 days.

(21) Appl. No.: 18/518,677

(22) Filed: Nov. 24, 2023

(65) Prior Publication Data
US 2024/0391524 A1    Nov. 28, 2024

(30) Foreign Application Priority Data
May 24, 2023   (KR) .................. 10-2023-0067148

(51) Int. Cl.
*B62D 6/00* (2006.01)
*B62D 5/00* (2006.01)
*B62D 5/04* (2006.01)
*B62D 6/04* (2006.01)

(52) U.S. Cl.
CPC ............. *B62D 6/008* (2013.01); *B62D 5/006* (2013.01); *B62D 5/046* (2013.01); *B62D 5/0481* (2013.01); *B62D 6/002* (2013.01); *B62D 6/04* (2013.01)

(58) Field of Classification Search
CPC ........ B62D 6/008; B62D 5/006; B62D 5/046; B62D 5/0481; B62D 6/002; B62D 6/04
See application file for complete search history.

(56) References Cited

U.S. PATENT DOCUMENTS

| | | | |
|---|---|---|---|
| 2019/0092377 A1* | 3/2019 | Shin | B62D 5/0481 |
| 2019/0126971 A1* | 5/2019 | Kim | B62D 5/006 |
| 2020/0307674 A1* | 10/2020 | Morino | B62D 15/021 |
| 2020/0307675 A1* | 10/2020 | Yamashita | B60W 40/08 |
| 2021/0269086 A1* | 9/2021 | Anraku | B62D 5/0481 |
| 2021/0403085 A1* | 12/2021 | Hong | B62D 6/10 |
| 2022/0081025 A1* | 3/2022 | Kakimoto | B62D 5/0424 |
| 2022/0258793 A1* | 8/2022 | Sun | B62D 5/0487 |
| 2023/0063764 A1* | 3/2023 | Do | B62D 5/0481 |

FOREIGN PATENT DOCUMENTS

KR    10-2018-0007393 A    1/2018

* cited by examiner

*Primary Examiner* — Phutthiwat Wongwian
*Assistant Examiner* — Susan E Scharpf
(74) *Attorney, Agent, or Firm* — NovoTechIP International PLLC

(57) ABSTRACT

Disclosed are an electronic steering apparatus for a vehicle and a method of controlling the same. The electronic steering apparatus for a vehicle includes an input module configured to receive a vehicle state and a steering state, a first driving module configured to drive a reaction motor that provides a steering wheel with a steering feel, a second driving module configured to drive a steering motor that steers a wheel, memory in which an execution program for steering control has been embedded, and a processor operatively coupled to the input module, the first driving module, the second driving module, and the memory.

8 Claims, 2 Drawing Sheets

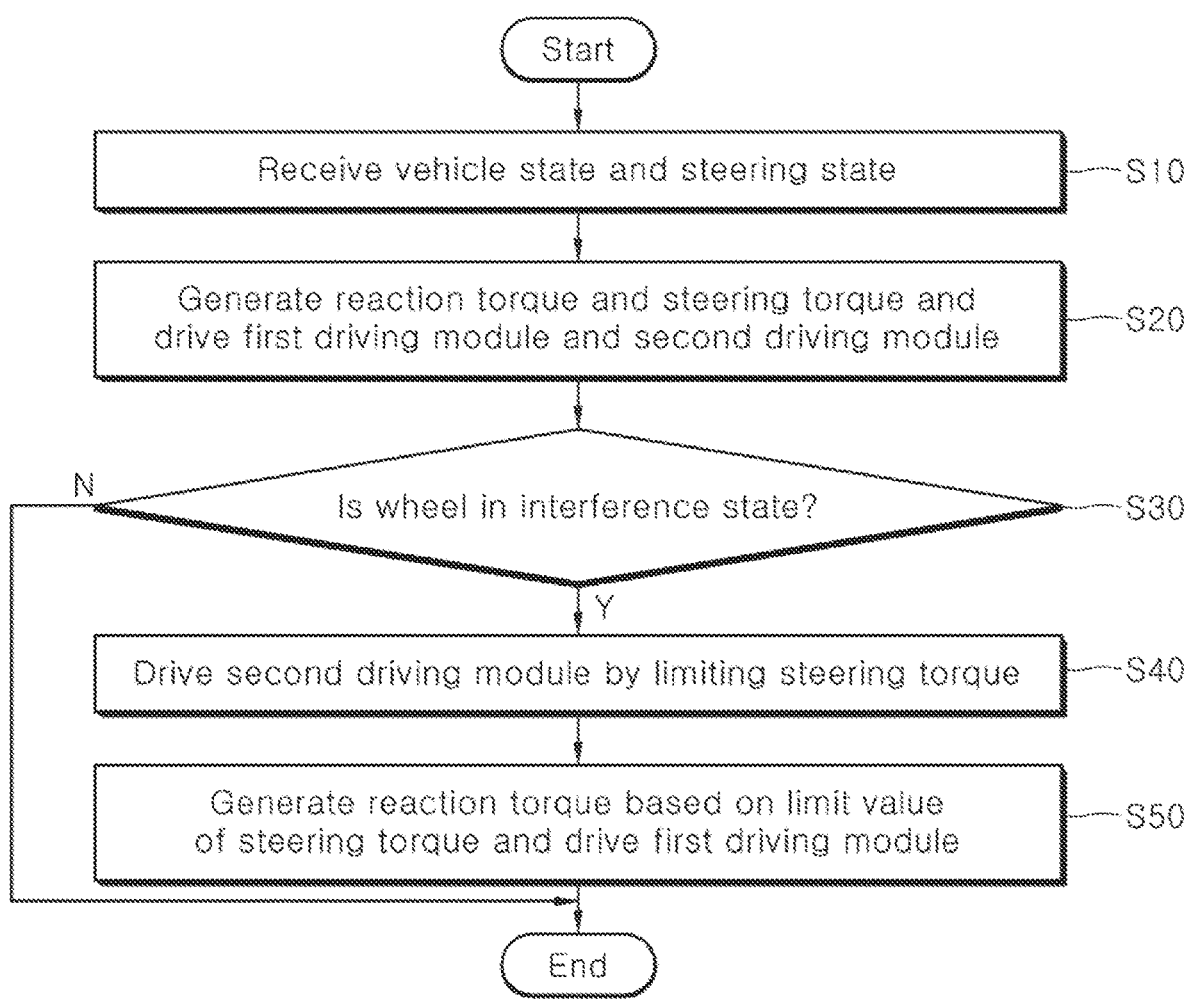

ELECTRONIC STEERING APPARATUS FOR VEHICLE AND METHOD OF CONTROLLING THE SAME

CROSS-REFERENCE TO RELATED APPLICATIONS

This application claims priority from and the benefit of Korean Patent Application No. 10-2023-0067148, filed on May 24, 2023, which is hereby incorporated by reference for all purposes as set forth herein.

TECHNICAL FIELD

Exemplary embodiments of the present disclosure relate to an electronic steering apparatus for a vehicle and a method of controlling the same, and more particularly, to an electronic steering apparatus for a vehicle and a method of controlling the same, which prevent misalignment from occurring between a wheel and a steering wheel while reducing current consumption when the wheel is not moved by interference, in an electronic steering apparatus using a steer-by-wire (SBW) method of performing steering by driving a steering motor connected to a rack bar based on a vehicle speed and a steering angle and generating a reaction to the steering wheel by driving a reaction motor.

BACKGROUND

In general, in order to provide convenience of a driving manipulation by assisting a manipulation force of a driver for a steering wheel, a power steering system is developed and applied to a steering apparatus for a vehicle. For such a power steering system, a hydraulic type that uses oil pressure, an electromotive hydraulic type that simultaneously uses oil pressure and an electromotive force of a motor, and an electromotive type that uses only an electromotive force of a motor have been developed and applied.

Recently, an electronic steering apparatus using the SBW method of removing mechanical connection devices, such as a steering column or a universal joint between a steering wheel and a wheel and a pinion shaft, and controlling the driving of a motor connected to a rack bar based on an electrical signal so that the steering of a vehicle is performed is developed and applied.

Such an electronic steering apparatus may be constructed to include a steering wheel for a steering manipulation of a driver, a reaction motor installed on one side of the steering wheel and configured to provide reaction torque according to the rotation of the steering wheel, a steering motor connected to a rack bar to implement a steering manipulation, sensors for detecting a steering angle, a vehicle speed, and torque of the steering wheel, respectively, and an electronic control unit (ECU) configured to drive the steering motor and the reaction motor in response to an electrical signal received from the sensor.

The electronic steering apparatus using the SBW method tends to be gradually increased in use because the electronic steering apparatus has advantages in that injuries to a driver attributable to a mechanical part upon collision of a vehicle can be reduced because a mechanical connection is not present, a vehicle can be reduced in weight due to a reduction in a mechanical connection part, unnecessary energy consumption can be reduced upon steering operation, and ideal steering performance can be achieved by ECU programming.

The Background Art of the present disclosure is disclosed in Korean Patent Application Publication No. 10-2018-0007393 (published on Jan. 23, 2018 and entitled "APPARATUS FOR CONTROLLING STEERING IN STEER-BY-WIRE SYSTEM AND METHOD THEREOF"), which is hereby incorporated by reference for all purposes as if set forth herein.

SUMMARY

As described above, the electronic steering apparatus using the SBW method has advantages in that a degree of freedom of the layout according to the construction of a steering system can be increased because a mechanical connection structure of the existing steering system is removed, fuel efficiency can be improved, and disturbance that is inversely input from a wheel can be removed.

However, in a situation in which the wheel of a vehicle is not rotated due to interference of an obstacle, such as a kerb or a wall surface, that is, a boundary between a road and a sidewalk, because the wheel and a steering wheel are not physically connected, if a driver continues to manipulate the steering wheel in an abnormal intention or a non-recognition state, an overcurrent occurs because a steering motor and a reaction motor are excessively driven in order to maintain an alignment state between the wheel and the steering wheel by placing the wheel and the steering wheel at the same location.

In particular, if the overcurrent occurs in the steering motor due to a high driving current, the output of the steering motor is reduced in order to prevent damage to hardware because an overheating phenomenon occurs within a short time.

However, if the output is simply reduced when the overcurrent occurs as described above, there is a problem in that a misalignment phenomenon occurs between the wheel and the steering wheel.

Various embodiments are directed to providing an electronic steering apparatus for a vehicle and a method of controlling the same, which prevent misalignment from occurring between a wheel and a steering wheel while reducing current consumption when the wheel is not moved by interference, in the electronic steering apparatus using the SBW method of performing steering by driving a steering motor connected to a rack bar based on a vehicle speed and a steering angle and generating a reaction to the steering wheel by driving a reaction motor.

In an embodiment, an electronic steering apparatus for a vehicle includes an input module configured to receive a vehicle state and a steering state, a first driving module configured to drive a reaction motor that provides a steering wheel with a steering feel, a second driving module configured to drive a steering motor that steers a wheel, memory in which an execution program for steering control has been embedded, and a processor operatively coupled to the input module, the first driving module, the second driving module, and the memory. The processor drives the first driving module and the second driving module by generating reaction torque and steering torque, respectively, so that the steering wheel and the wheel are aligned based on the vehicle state and steering state received from the input module by driving the execution program, drives the second driving module by limiting the steering torque when an interference state of the wheel is determined, and drives the first driving module by generating the reaction torque based on a limit value of the steering torque.

In an embodiment of the present disclosure, the processor determines a state in which locations of the steering wheel and the wheel have not been changed in a state in which a steering end has not been reached as the interference state of the wheel.

In an embodiment of the present disclosure, the processor determines the interference state of the wheel when a vehicle speed is less than a set vehicle speed.

In an embodiment of the present disclosure, the processor estimates a rack force value to be applied to the steering motor based on the limit value of the steering torque, and generates the reaction torque by integrating the estimated rack force value and an actual rack force value according to the driving of the steering motor.

In an embodiment of the present disclosure, the processor generates the reaction torque by generating a virtual rack force value that is applied to the steering motor based on the limit value of the steering torque.

In an embodiment of the present disclosure, the processor drives the second driving module by changing a target location of the wheel when the interference state of the wheel is determined, and generates the reaction torque by incorporating an actual rack force value according to the driving of the steering motor and a rack force value that is reduced due to a change in the target location.

In an embodiment, a method of controlling an electronic steering apparatus for a vehicle includes receiving, by a processor, a vehicle state and a steering state through an input module, driving, by the processor, a first driving module and a second driving module by generating reaction torque and steering torque, respectively, so that a steering wheel and a wheel are aligned based on the received vehicle state and steering state, determining, by the processor, an interference state of the wheel based on the vehicle state and the steering state, driving, by the processor, the second driving module by limiting the steering torque when the wheel is in the interference state as a result of the determination of the interference state of the wheel, and driving, by the processor, the first driving module by generating the reaction torque based on a limit value of the steering torque.

In an embodiment of the present disclosure, the driving of the first driving module by generating the reaction torque includes estimating, by the processor, a rack force value to be applied to the steering motor based on the limit value of the steering torque, and generating, by the processor, the reaction torque by integrating the estimated rack force value and an actual rack force value according to the driving of the steering motor.

In an embodiment of the present disclosure, the driving of the first driving module by generating the reaction torque includes generating, by the processor, the reaction torque by generating a virtual rack force value that is applied to the steering motor based on the limit value of the steering torque.

In an embodiment of the present disclosure, the driving of the first driving module by generating the reaction torque includes driving, by the processor, the second driving module by changing a target location of the wheel when the interference state of the wheel is determined, and generating, by the processor, the reaction torque by incorporating an actual rack force value according to the driving of the steering motor and a rack force value that is reduced due to a change in the target location.

The electronic steering apparatus for a vehicle and the method of controlling the same according to aspects of the present disclosure can protect a system against overheating and also prevent misalignment from occurring between the wheel and the steering wheel by reducing current consumption in a way to limit the output of the steering motor and drive the reaction motor by generating reaction torque based on a limit value when the wheel is not moved by interference, in the electronic steering apparatus using the SBW method of performing steering by driving the steering motor connected to a rack bar based on a vehicle speed and a steering angle and generating a reaction to the steering wheel by driving the reaction motor.

BRIEF DESCRIPTION OF THE DRAWINGS

FIG. 2 is a flowchart for describing a method of controlling the electronic steering apparatus for a vehicle according to an embodiment of the present disclosure.

DETAILED DESCRIPTION

Figure 1:
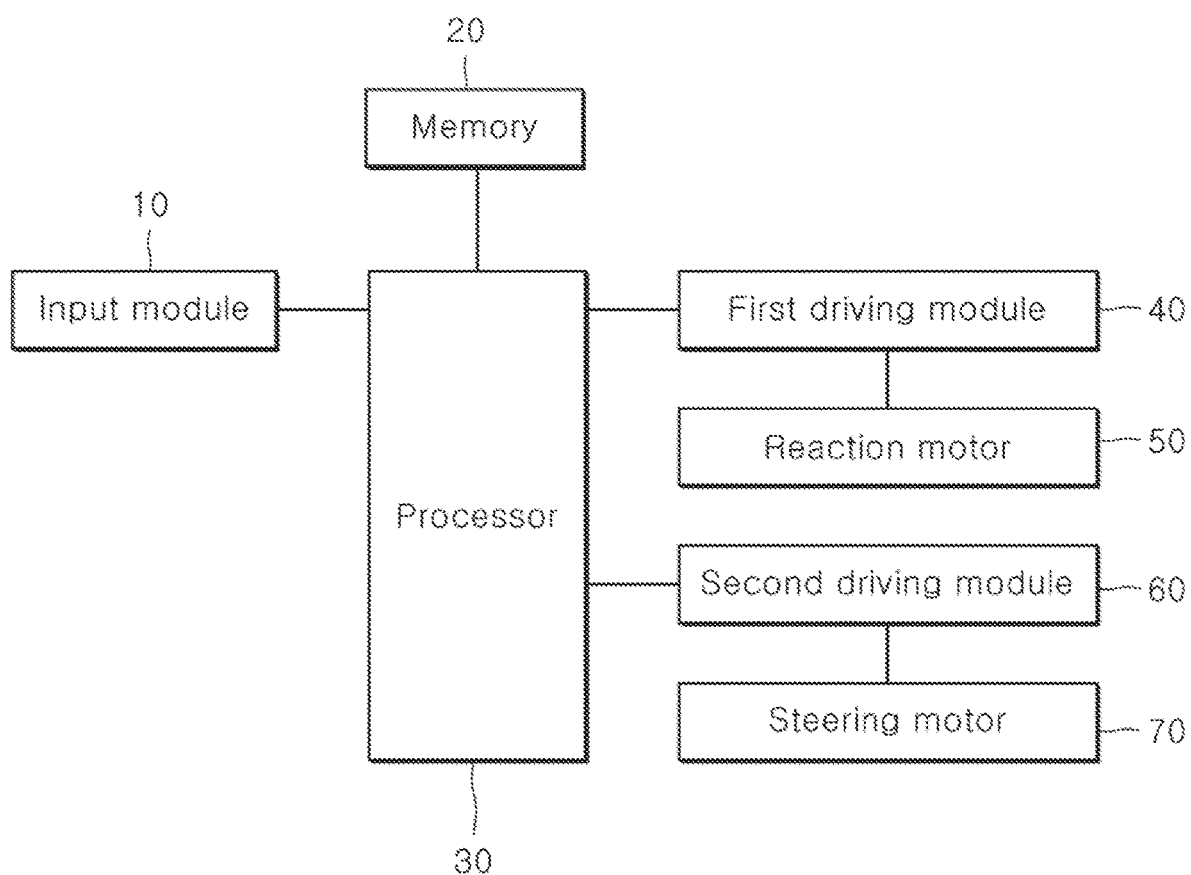
FIG. 1 is a block construction diagram illustrating an electronic steering apparatus for a vehicle according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implementations, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

Hereinafter, an electronic steering apparatus for a vehicle and a method of controlling the same according to embodiments of the present disclosure will be described with reference to the accompanying drawings. In this process, the thicknesses of lines or the sizes of components illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

FIG. 1 is a block construction diagram illustrating an electronic steering apparatus for a vehicle according to an embodiment of the present disclosure.

As illustrated in FIG. 1, the electronic steering apparatus for a vehicle according to an embodiment of the present disclosure may include an input module 10, a first driving module 40, a second driving module 60, memory 20, and a processor 30.

The input module 10 may receive a vehicle state and a steering state from a control device within the vehicle through CAN communication.

In this case, the vehicle state and the steering state that are received through the input module 10 may include any one or more of a target steering angle of a steering motor 70, a current location of the steering motor 70, a speed and angular speed of the steering motor 70, a driving current of the steering motor 70, a current steering angle of a reaction motor 50, a speed and angular speed of the reaction motor 50, torque of a steering wheel, and a vehicle speed.

The first driving module 40 may drive the reaction motor 50 that provides a steering feel to the steering wheel.

The second driving module 60 may drive the steering motor 70 that steers a wheel.

The memory 20 may store an execution program for an operation of the electronic steering apparatus and related data. The stored information may be independently selected by the processor 30 if necessary.

That is, the memory 20 stores an operating system for the driving the electronic steering apparatus or various types of data that are generated in a process of executing an application (or a program or applet). In this case, the memory 20 commonly refers to a non-volatile storage device that continues to retain information stored therein although power is not supplied thereto and a volatile storage device that requires power in order to retain information stored therein. Furthermore, the memory 20 may perform a function for temporarily or permanently storing data that are processed by the processor 30.

In this case, the memory 20 may include magnetic storage media or flash storage media in addition to the volatile storage device that requires power in order to retain information stored therein, but the scope of the present disclosure is not limited thereto.

The processor 30 is operatively coupled to the input module 10, the first driving module 40, the second driving module 60, and the memory 20, and may perform various operations by copying, to RAM, various programs stored in the memory 20 and executing the various programs in order to control an overall operation of the electronic steering apparatus.

In this case, the processor 30 has been described as including only one CPU, but may be implemented to control the first driving module 40 and the second driving module 60 through a plurality of CPUs (or DSPs or SoCs) upon implementation.

In various embodiments, the processor 30 may be implemented as a digital signal processor (DSP), a microprocessor, or a time controller (TCON) that processes a digital signal, but the present disclosure is not limited thereto. The processor 30 may include one or more of a central processing unit (CPU), a micro controller unit (MCU), a micro processing unit (MPU), a controller, an application processor (AP), a communication processor (CP), and an ARM processor or may be defined by a corresponding term. Furthermore, the processor 30 may be implemented as a system on chip (SoC) in which a processing algorithm has been embedded or large scale integration (LSI), and may be implemented in the form of a field programmable gate array (FPGA).

That is, the processor 30 may drive the first driving module 40 and the second driving module 60 by generating reaction torque and steering torque, respectively, so that the steering wheel and a wheel are aligned based on the vehicle state and the steering state received from the input module 10 by driving an execution program for steering control.

Furthermore, when an interference state of the wheel is determined, the processor 30 may drive the second driving module 60 by limiting the steering torque, and may drive the first driving module 40 by generating the reaction torque based on a limit value of the steering torque. That is, the processor 30 may stop the driving of the steering motor 70 by limiting the steering torque.

In this case, if the steering wheel and the wheel are in the state in which the locations of the steering wheel and the wheel have not been changed even though a steering end set based on physical characteristics of the vehicle has not been reached, the processor 30 may determine the state of the wheel to be the interference state in which the wheel receives interference due to an obstacle.

In this case, the processor 30 may determine the interference state of the wheel only when a vehicle speed is less than a set vehicle speed. That is, the processor 30 may determine the interference state of the wheel only in a low-speed driving state or a stop state.

If the location of the wheel is not changed due to the interference state of the wheel as described above, the processor 30 may drive the first driving module 40, by estimating a rack force value to be applied to the steering motor 70 based on the limit value of the steering torque and generating the reaction torque by integrating the estimated rack force value and an actual rack force value according to the driving of the steering motor 70.

Furthermore, the processor 30 may generate a virtual rack force value that is applied to the steering motor 70 based on the limit value of the steering torque, and may drive the first driving module 40 by generating the reaction torque based on the virtual rack force value.

When the interference state of the wheel is determined, the processor 30 may drive the second driving module 60 by changing a target location of the wheel, and may drive the first driving module 40 by generating the reaction torque by incorporating the actual rack force value according to the driving of the steering motor 70 and a rack force value that is reduced due to a change in the target location.

That is, the processor 30 may stop the driving of the steering motor 70 so that an overcurrent is prevented, by changing the target location of the wheel into a current location because the target location is not changed due to interference at a location corresponding to the steering wheel.

As described above, the electronic steering apparatus for a vehicle according to an embodiment of the present disclosure can protect a system against overheating and also prevent misalignment from occurring between the wheel and the steering wheel by reducing current consumption in a way to limit the output of the steering motor and drive the reaction motor by generating reaction torque based on a limit value when the wheel is not moved by interference, in the electronic steering apparatus using the SBW method of performing steering by driving the steering motor connected to a rack bar based on a vehicle speed and a steering angle and generating a reaction to the steering wheel by driving the reaction motor.

FIG. 2 is a flowchart for describing a method of controlling the electronic steering apparatus for a vehicle according to an embodiment of the present disclosure.

As illustrated in FIG. 2, in the method of controlling the electronic steering apparatus for a vehicle, first, the processor 30 drives the execution program embedded in the memory 20 by executing the execution program, and then receives a vehicle state and a steering state through the input module 10 (S10).

In this case, the vehicle state and the steering state received through the input module 10 may include any one or more of a target steering angle of the steering motor 70, a current location of the steering motor 70, a speed and angular speed of the steering motor 70, a driving current of the steering motor 70, a current steering angle of the reaction motor 50, a speed and angular speed of the reaction motor 50, torque of the steering wheel, and a vehicle speed.

After receiving the vehicle state and the steering state in step S10, the processor 30 drives the first driving module 40 and the second driving module 60 by generating reaction torque and steering torque, respectively, so that the steering wheel and a wheel are aligned based on the received vehicle state and steering state (S20).

As described above, the processor may perform steering control by generating the reaction torque and the steering torque based on the vehicle state and the steering state in a normal situation.

While performing the steering control as described above, the processor 30 determines the interference state of the wheel based on the vehicle state and the steering state (S30).

In this case, the processor 30 may determine the interference state of the wheel only when a vehicle speed is less than a set vehicle speed. That is, the processor 30 may determine the interference state of the wheel only in the low-speed driving state or the stop state.

Furthermore, if the interference state of the steering wheel is the state in which the locations of the steering wheel and the wheel have not been changed even though a steering end set depending on physical characteristics of the vehicle has not been reached, the processor 30 may determine the state of the wheel to be the interference state in which the wheel receives interference due to an obstacle.

If the wheel is determined to be in the interference state by determining the interference state of the wheel in step S30, the processor 30 drives the second driving module 60 by limiting the steering torque (S40). That is, the processor 30 may stop the driving of the steering motor 70 by limiting the steering torque.

Simultaneously with limiting the steering torque in step S40, the processor 30 drives the first driving module 40 by generating he reaction torque based on a limit value of the steering torque (S50).

In step S50, the processor 30 may drive the first driving module 40, by estimating a rack force value to be applied to the steering motor 70 based on the limit value of the steering torque and generating the reaction torque by integrating the estimated rack force value and an actual rack force value according to the driving of the steering motor 70.

Furthermore, the processor 30 may generate a virtual rack force value that is applied to the steering motor 70 based on the limit value of the steering torque, and may drive the first driving module 40 by generating the reaction torque based on the virtual rack force value.

When the interference state of the wheel is determined in step S30, the processor 30 may drive the second driving module 60 by changing a target location of the wheel, and may drive the first driving module 40 by generating the reaction torque by incorporating the actual rack force value according to the driving of the steering motor 70 and a rack force value that is reduced due to a change in the target location.

That is, the processor 30 may stop the driving of the steering motor 70 so that an overcurrent is prevented, by changing the target location of the wheel into a current location because the target location is not changed due to interference at a location corresponding to the steering wheel.

As described above, the method of controlling the electronic steering apparatus for a vehicle according to an embodiment of the present disclosure can protect a system against overheating and also prevent misalignment from occurring between the wheel and the steering wheel by reducing current consumption in a way to limit the output of the steering motor and drive the reaction motor by generating reaction torque based on a limit value when the wheel is not moved by interference, in the electronic steering apparatus using the SBW method of performing steering by driving the steering motor connected to a rack bar based on a vehicle speed and a steering angle and generating a reaction to the steering wheel by driving the reaction motor.

What is claimed is:

1. An electronic steering apparatus for a vehicle, comprising:
   an input module configured to receive signals indicating a vehicle state and a steering state;
   a first driving module configured to drive a reaction motor of a steering wheel;
   a second driving module configured to drive a steering motor that steers a controlled wheel;
   a memory in which an execution program for steering control is stored; and
   a processor operatively coupled to the input module, the first driving module, the second driving module, and the memory,
   wherein the processor, when executing the program, controls the first driving module and the second driving module to generate reaction torque on the steering wheel and steering torque on the controlled wheel, respectively, so that the steering wheel and the controlled wheel are aligned based on the vehicle state and steering state, and
   wherein the processor, when executing the program, further controls the second driving module by limiting the steering torque when an interference state of the controlled wheel is determined, and drives the first driving module to generate the reaction torque based on a limit value of the steering torque;
   wherein the interference state of the controlled wheel is determined as a state in which locations of the steering wheel and the controlled wheel have not been changed and a steering end has not been reached.

2. The electronic steering apparatus of claim 1, wherein the processor, when executing the program:
   estimates a rack force value to be applied to the steering motor based on the limit value of the steering torque, and controls the first driving module to generate the reaction torque by integrating the estimated rack force value and an actual rack force value.

3. The electronic steering apparatus of claim 1, wherein the processor, when executing the program, controls the first driving module to generate the reaction torque by generating a virtual rack force value that is applied to the steering motor based on the limit value of the steering torque.

4. The electronic steering apparatus of claim 1, wherein the processor, when executing the program:
controls the second driving module by changing a target location of the controlled wheel when the interference state of the controlled wheel is determined, and
controls the first driving module to generate the reaction torque by incorporating an actual rack force value according to driving of the steering motor and a rack force value that is reduced due to a change in the target location.

5. An electronic steering apparatus for a vehicle, comprising:
an input module configured to receive signals indicating a vehicle state and a steering state;
a first driving module configured to drive a reaction motor of a steering wheel;
a second driving module configured to drive a steering motor that steers a controlled wheel;
a memory in which an execution program for steering control is stored; and
a processor operatively coupled to the input module, the first driving module, the second driving module, and the memory,
wherein the processor, when executing the program, controls the first driving module and the second driving module to generate reaction torque on the steering wheel and steering torque on the controlled wheel, respectively, so that the steering wheel and the controlled wheel are aligned based on the vehicle state and steering state, and
wherein the processor, when executing the program, further controls the second driving module by limiting the steering torque when an interference state of the controlled wheel is determined, and drives the first driving module to generate the reaction torque based on a limit value of the steering torque;
wherein the processor determines the interference state of the controlled wheel when a vehicle speed is less than a set vehicle speed.

6. A method of controlling an electronic steering apparatus for a vehicle, the method comprising:
receiving, through an input module of a processor, signals indicating a vehicle state and a steering state;
driving, by the processor, a first driving module and a second driving module to generate reaction torque and steering torque, respectively, so that a steering wheel and a controlled wheel are aligned based on the received indications of vehicle state and steering state;
determining, by the processor, whether the controlled wheel is in an interference state based on the vehicle state and the steering state;
driving, by the processor, the second driving module to limit the steering torque when the controlled wheel is in the interference state; and
driving, by the processor, the first driving module to generate the reaction torque based on a limit value of the steering torque;
wherein the driving of the first driving module to generate the reaction torque comprises:
estimating, by the processor, a rack force value to be applied to the steering motor based on the limit value of the steering torque, and
generating, by the processor, the reaction torque by integrating the estimated rack force value and an actual rack force value according to the driving of the steering motor.

7. The method of claim 6, wherein the driving of the first driving module to generate the reaction torque comprises generating, by the processor, a value for the reaction torque by generating a virtual rack force value that is applied to the steering motor based on the limit value of the steering torque.

8. The method of claim 6, wherein the driving of the first driving module to generate the reaction torque comprises:
driving, by the processor, the second driving module by changing a target location of the controlled wheel when the interference state of the controlled wheel is determined, and
generating, by the processor, the value for the reaction torque by incorporating an actual rack force value according to the driving of the steering motor and a rack force value that is reduced due to a change in the target location.

\* \* \* \* \*